UNITED STATES PATENT OFFICE

2,420,172

ELECTRICAL INSULATING MATERIAL CONTAINING MICA

Robert L. Griffeth, Delanson, and Joseph J. Pickney, Ballston Lake, N. Y., assignors to Mica Insulator Company, Schenectady, N. Y., a corporation of New Jersey No Drawing. Application December 6, 1940,
Serial No. 368,906

17 Claims. (Cl. 154—2.6)

The present invention relates to insulating materials of the type containing a relatively large proportion of mica and comprises a new flexible product of this type which has greatly improved physical and electrical properties.

Laminated insulating materials, whether composed of mica and a sheet material such as asbestos, paper, silk or the like, or of mica alone, require a binder to hold the flakes together in laminations and to hold the mica laminations to the sheet material. It is important in many applications that these insulating materials shall have not only a high di-electric strength but also that they be able to withstand for extended periods of time without substantial change in physical properties, the relatively high temperatures encountered in actual use. In products of this type now in use it is invariably the binder which is the weakest part of the insulating material. When the product is subjected to temperatures over 212° F. for a few days, the binder is apt to lose all of its flexibility, with the result that the insulation becomes brittle and cracks easily, causing short circuits. Many organic binders carbonize quite readily at temperatures around 450° F., which also is a cause of short circuits. Also, these products are apt to deteriorate when stored.

In accordance with the present invention these and other difficulties are overcome and a superior product is obtained when mica flakes are bonded together with a cementing agent comprising a resinous composition of a polymerized butylene, particularly polyisobutylene. The products made with this type of agent retain their flexibility substantially indefinitely at temperatures as high as 350° F. and the agent does not carbonize at temperatures as high as 500° F. The products may be stored for weeks without deterioration in physical or electrical properties.

In preparing the new product the polyisobutylene resin is first dissolved in a suitable solvent such as benzol, toluol or xylol. For example, one and one-half lbs. of resin are dissolved in one gallon of the solvent. The cementing solution is then applied between layers of mica flakes until the desired thickness of mica plate is obtained. The plate is then heated sufficiently to evaporate the solvent, and thereafter rolled or pressed slightly and cut to the desired shapes or sizes. When sheet insulation of paper, cloth or the like is to be combined with the mica plate, the sheet material is cemented to the mica plate on one or both sides, as desired, prior to the heating and pressing.

The proportion of binder to be used relative to the weight of the final product will vary, depending upon the nature of the desired insulation. For mica plate, for example, the amount of binder employed should be such that there will be from 10 to 25 per cent. by weight of the binder in the final product, whereas in composite insulations including silk, paper, asbestos, cotton fabric, synthetic resin sheeting, or glass fabric, relatively less binder, anywhere from 3 to 20 per cent. by weight is employed. As compared to products now in use, this is a substantial reduction in the percentage of binder, and as the binder, in this type of product, is a necessary evil, the less binder required the more satisfactory the product.

In recent years attempts have been made to use woven glass fabric and mica, that is, flexible woven glass material cemented to mica flakes, as electrical insulation because of the excellent heat resistant properties and lack of carbonization of the glass material. These excellent properties of the woven glass material, however, were offset by the failure of binding agents heretofore in use because such agents would carbonize and deteriorate at lower temperatures, with the result that the composite insulation was not superior to mica plate alone. In accordance with the present invention, woven glass material may be combined with mica or mica plate by the use of a polybutylene resin and the resulting product will retain its flexibility, its high di-electric strength and its resistance to heat when subjected to temperatures up to 500° F. Thus these binding agents make possible the successful utilization of glass fabric in the electrical insulation field.

Instead of glass fabric, other sheet materials may be bonded to mica plate with polyisobutylene resin to form a flexible insulating material that will retain its physical and electrical properties after subjection to relatively high temperatures. Such other sheet material may be, as heretofore indicated, paper, asbestos, silk, cotton fabric, synthetic resin sheeting or the like. Polyisobutylene resins have very little odor, are substantially colorless, and non-toxic. They are insoluble in gasoline and alcohol and very resistant to water, acids and aliphatic solvents. They are resistant to cold transformer oils and adhere firmly to glass, mica, paper, asbestos or the like.

The composite insulating materials made as above described are suitable for use wherever flexible electrical insulation is desired, as for example, for slot and phase insulation and for core and primary and secondary insulation of air cooled transformers. Where relatively less flexible insulation is desired, the polyisobutylene resins used as binding agents may have from 5 to 75 per cent. of a compatible natural or synthetic resin incorporated therewith. For example, a polyhydric alcohol ester of rosin may be mixed with the polyisobutylene resin to add stiffness to the finished product. Small amounts, say from 2 to 15% of poly-n-butylene may be admixed with the polyisobutylene resin without materially affecting the properties of the mica plate made therewith.

The following is claimed:

1. A laminated electrical insulating material comprising mica flakes bonded together with a resin composition comprising a polymer of isobutylene.

2. A flexible electrical insulating material containing from 10 to 25% by weight of polyisobutylene resin and the balance mica flakes.

3. An electrical insulating material of mica and woven glass fabric cemented together with polyisobutylene resin.

4. A flexible electrical insulating material comprising mica plate and sheet material cemented together with a polyisobutylene resin.

5. The flexible insulating material according to claim 4 wherein the polyisobutylene resin comprises 3 to 25% by weight of the material.

6. An insulating material comprising mica flakes bonded together with a polyisobutylene resin modified by the addition of from 5 to 75% of a polyhydric alcohol ester of rosin, the mica comprising from 75 to 90% by weight of the material.

7. A flexible insulating material having high di-electric strength and substantial heat resisting properties comprising mica flakes and glass fabric bonded together with a polyisobutylene resin, the resin comprising from 3 to 25% by weight of the material.

8. An insulating material characterized by its continued flexibility after extended exposure to heat, comprising mica flakes bonded together with polyisobutylene resin and cemented thereby to a sheet material.

9. An electrical insulating material comprising mica flakes bonded together with a resin composition comprising a polymer of isobutylene admixed with from 2 to 15% of poly-n-butylene.

10. Insulating material, comprising in combination, mica flakes, a base material for supporting the mica flakes, and a bonding agent which resists age hardening composed of polyisobutylene to bind the base material and the mica flakes into a whole.

11. Flexible insulating material, comprising, in combination, a base comprising a fabric of glass fibers, a coating of resin on the fabric, a distribution of mica flakes on the coated fabric, and a bonding agent composed of polyisobutylene applied to the mica flakes to bind the fabric and the mica flakes into a unitary material that resists age hardening, is highly moisture resistant and does not appreciably carbonize at elevated temperatures.

12. Flexible insulating material, comprising in combination, a base comprising a fabric of glass fibers, a distribution of mica flakes on the fabric, and a bonding agent composed of polyisobutylene applied to the mica flakes to bind the fabric and the mica flakes into a unitary material that resists age hardening, is highly moisture resistant and does not appreciably carbonize at elevated temperatures.

13. A flexible electrically insulating material, comprising, in combination, a fabric base, flakes of mica upon the fabric base and superposed upon each other, a fabric covering substantially coextensive with the fabric base over the mica flakes, and a binder composed of polyisobutylene for bonding the whole.

14. A flexible electrically insulating material, comprising, in combination, a fabric base, flakes of mica upon the fabric base and superposed upon each other, a fabric covering substantially coextensive with the fabric base over the mica flakes, the fabric base and fabric covering comprising woven glass fibers, and a binder composed of polyisobutylene for bonding the whole.

15. A flexible moisture-resisting insulating material suitable for use as slot insulation in dynamo-electric machines comprising a ply of fabric composed of glass fibers, a layer of mica flakes on the ply of fabric and a bonding agent composed of polyisobutylene binding the mica flakes and glass fabric.

16. A flexible moisture-resisting insulating material suitable for use as slot insulation in dynamo-electric machines, composed of a first ply of fabric woven from glass fibers, a layer of mica flakes on the first ply of fabric, a second ply of fabric over the mica flakes and a binder composed of polyisobutylene for bonding the plies of glass fabric and the mica flakes.

17. A laminated electrically insulating material composed of mica flakes and a binder therefor composed of polyisobutylene, the laminated product being characterized by flexibility, resistance to age hardening and low power factor.

ROBERT L. GRIFFETH.
JOSEPH J. PICKNEY.

REFERENCES CITED

The following references are of record in the file of this patent:

UNITED STATES PATENTS

| Number | Name | Date |
|---|---|---|
| 2,138,895 | Wiezevich | Dec. 6, 1938 |
| 2,183,811 | Homan | Dec. 19, 1939 |
| 2,145,350 | Haslam | Jan. 31, 1938 |
| 2,054,356 | Boughton | Sept. 15, 1936 |
| 1,948,756 | Hadley | Feb. 27, 1934 |
| 2,320,866 | Hill | June 1, 1943 |
| 2,194,958 | Szegvari | Mar. 26, 1940 |
| 2,226,589 | Smyers | Dec. 31, 1940 |
| 2,278,207 | Mathes | Mar. 31, 1942 |

FOREIGN PATENTS

| Number | Country | Date |
|---|---|---|
| 508,035 | British | June 26, 1939 |
| 508,057 | British | June 26, 1939 |